Aug. 12, 1969     H. A. MERGES     3,460,769
METHOD AND APPARATUS FOR RECLAIMING RUBBER SCRAP
Filed July 12, 1966     2 Sheets-Sheet 2
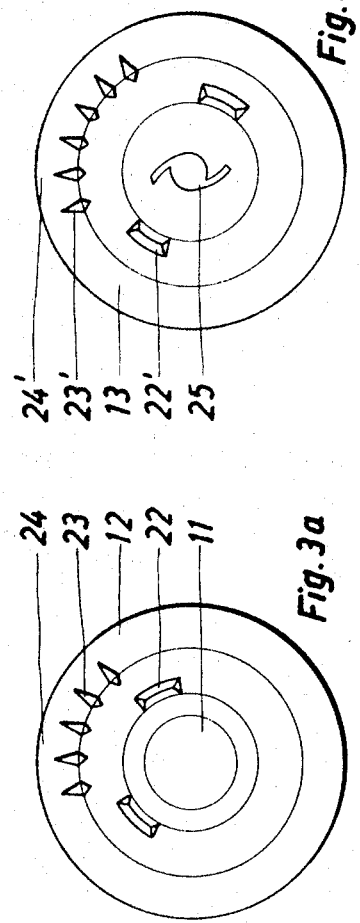
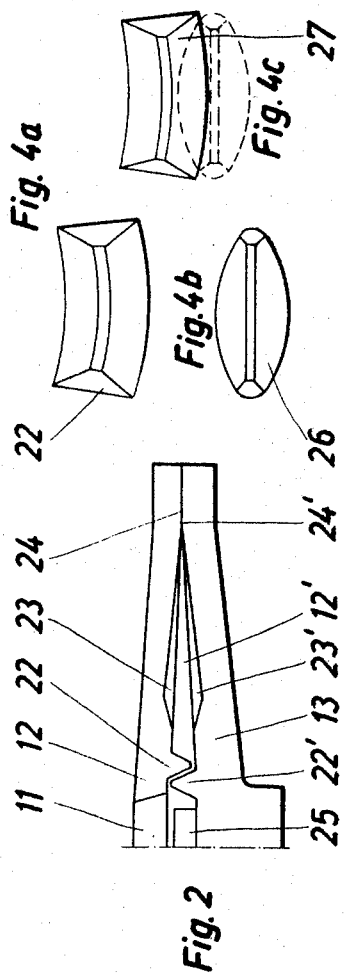
Inventor:
HERBERT ALFRED MERGES
BY Kurt Kelman
AGENT

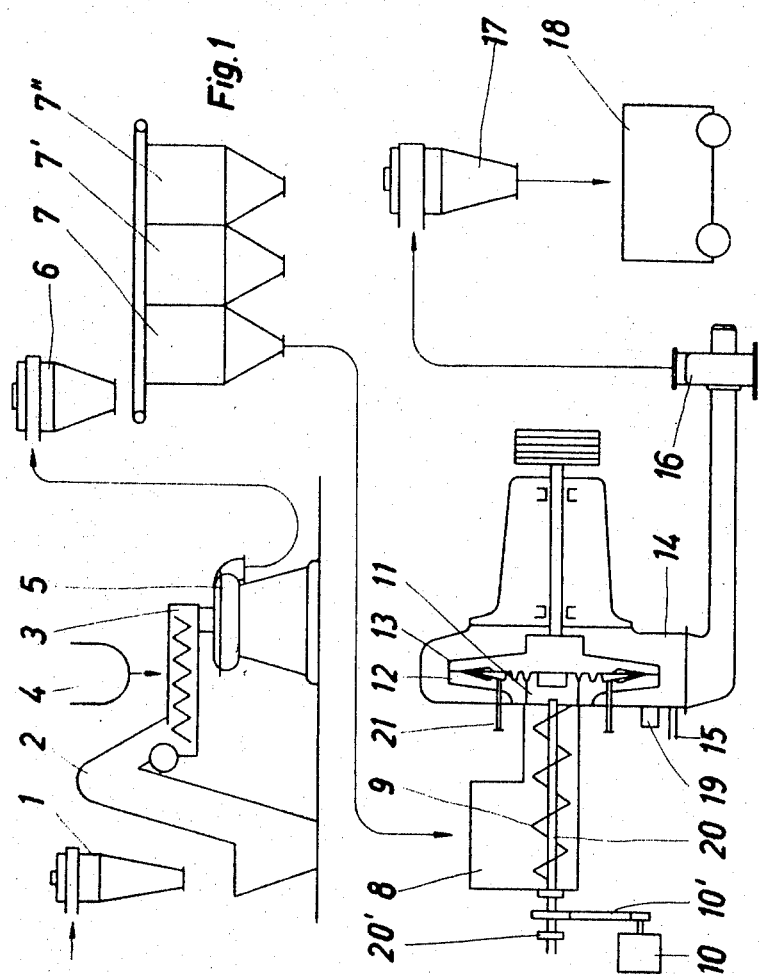

United States Patent Office 3,460,769
Patented Aug. 12, 1969

3,460,769
METHOD AND APPARATUS FOR RECLAIMING RUBBER SCRAP
Herbert Alfred Merges, Werkstrasse 1,
6451 Wolfgang, Germany
Filed July 12, 1966, Ser. No. 564,694
Claims priority, application Germany, July 20, 1965,
U 11,897
Int. Cl. B02c *1/00;* B01d *45/12*
U.S. Cl. 241—17                        8 Claims

ABSTRACT OF THE DISCLOSURE

Vulcanized rubber scrap is reclaimed by heating and intimately mixing it with additives after the scrap has been pulverized, and this heated mixture is subjected to centrifugal forces while being exposed in a matter of second to friction, milling, shearing and crushing forces in a pulsating manner.

---

The invention relates to a method for continuously reclaiming vulcanized, pre-pulverized rubber scrap as well as to an apparatus for carrying out the method of the invention.

It is known, in discontinuous methods, to pulverize vulcanized rubber scrap to a fine degree, then to mix the pulverized scrap with suitable additives, such as plasticizers, oil, or the like, for the purpose of swelling the material and, after the swelling action has ended, either directly or after maintaining the material in storage for a given time, feeding the material into a steam-heated autoclave or regenerating tank, so as to regenerate the material at a suitable temperature and in a given period of time. The rubber scrap which has been regenerated in this way by the action of the heat is then delivered to a so-called refining apparatus.

It is known to treat the material continuously according to a method where the pre-pulverized rubber scrap is delivered to a so-called reclaimer which consists of a jacketed, heated housing in which a heated rotary screw turns at a relatively slow speed. By means of this screw, the material which is to be reclaimed is pressed to a nozzle-shaped outlet, these operations taking place at a temperature of 200° C. and requiring a through-put time of 3–5 minutes. With this method, the rubber material is intensely stressed by the long heating of up to 200° C., and the quality of the reclaimed product is unfavorably influenced. The high purchase price and power consumption of such machines are further disadvantages which have prevented the introduction and wide use of this method.

Also, a known machine operates in a similar manner by way of a double screw or a double-screw extruder in order to plasticize the vulcanized rubber. In this case also, the material which is to be plasticized is subjected for a long period of time to a temperature of at least 200° C., in order to achieve plasticizing of the material.

It is, therefore, a primary object of the present invention to provide a method and apparatus which will avoid the above drawbacks.

In particular, it is an object of the present invention to provide a continuous treating method which requires a treating time which is considerably shorter than that previously required.

In addition, it is an object of the invention to provide a method and apparatus which will preserve the rubber materials to the greatest possible extent.

Also, it is an object of the present invention to provide a method and apparatus which will achieve a reclaimed product which is entirely homogeneous.

The method and apparatus of the present invention are capable of subjecting the material which is treated to centrifugal force while simultaneously exposing the rubber particles in a pulsating manner to friction, milling, shearing, and crushing forces, this entire treatment taking place in accordance with the invention in a matter of seconds. The expression "a matter of seconds" signifies, in the description and claims, a time period which is but a small part of a few seconds, this time period at a maximum being 2–5 seconds. Thus, in accordance with the present invention, the particles which are treated are not, as is known, subjected by batches in a more or less haphazard manner and for a relatively long period of time to forces which stress the material. Instead, with the method and apparatus of the invention, the particles are at least approximately individually treated while being compelled to pass through a region where the particles are stressed, the particles being constantly subjected to continuously effective transporting forces which maintain the particles in movement, so that a relatively large dwelling time for any one particle at any one stressing region is not possible.

The apparatus which carries out the method of the invention and which itself forms part of the invention includes a pair of discs which are situated in a suitable housing and which are capable of subjecting the material to centrifugal force while also exposing the material to friction, milling, shearing, and crushing forces. The pair of discs of the invention have working faces which are directed toward and located adjacent each other, and a rotating means is operatively connected with at least one of these discs for rotating it relative to the other disc. One of the discs is formed with a central feed opening through which the material is fed into the space between the discs, and the discs define between themselves, at their working faces, an annular gap which is defined by surfaces of the working faces which converge toward each other in a direction toward the outer peripheries of the discs, these surfaces which define the latter gap being provided with elevations and depressions and merging into peripheral annular surfaces of the working faces which are flat and which surround the gap, these flat peripheral surfaces being located closely adjacent to each other. A means communicates with the feed opening to treat the material in advance of the feed opening while feeding the material to the feed opening so that it will pass centrifugally therefrom through the space between the discs, and this means which communicates with the feed opening can include supply structures for transporting the material, metering screws or the like, storage containers, mixing devices, such as mixing screws, mills which include toothed discs or the like, etc. A receiving means communicates with the housing in which the above-mentioned discs of the invention are located for receiving the reclaimed product therefrom, and a suction blower communicates with the receiving means for withdrawing the reclaimed product therefrom.

The desired plasticity is determined in a known way by the addition of a regenerating oil or a similar material used for this purpose. The less such an additive is mixed with the material to be treated the less the degree of plasticity, and vice versa. Thus, the finely pulverized rubber, the finer the better, forms a mixture which is intimately combined with a medium suitable for swelling of the material to such an extent that the treatment takes place throughout the entire body of material so as to achieve a homogeneous product. At the same time however this reclaimed product of the invention, inasmuch as it is thermally stressed "in a matter of seconds," can immediately be further treated or cooled to a lower temperature so as to be suitable for storing. Since it is known that oxidation is required for regeneration, it is of advantage to supply air in addition to the other additives which to some extent already have a catalytic oxidation accelerating action.

According to the particular circumstances or conditions which are encountered, it is possible to supply steam to the apparatus, and the temperature of the steam will be determined in accordance with the material which is treated, as required to produce the necessary heat and dampness.

In the event that a lesser amount of regenerating mediums are mixed with the rubber scrap, or if it is worked at a relatively low temperature, then the treated material acquires a lesser degree of plasticity and remains in a flowable condition. On the other hand, if the rubber scrap is mixed with more of the regenerating mediums, or is worked at a higher temperature, so that the plasticity and adhesive characteristics of the material increase, then in order to prevent agglomerations of the plasticized particles a uniformly fine powdering or dusting of the treated material with zinc stearate or with another suitable separating medium is provided, so that in this way at the same time an easier and more homogeneous mixing can take place during the further treatment.

For the purpose of preparing new mixtures, the manufactured reclaimed product, as is known with other additives, can be weighed out in predetermined portions or can, for example, be packed in suitable polyethylene containers, for example, so as to be delivered in this way to mixers, elevators, or mixing rolls.

In order to carry out the method of the invention, the device described in general above is used, and the material which is fed to this device is in a finely pulverized form and has preferably already been sieved to a uniform degree of fineness from the initial vulcanized rubber scrap, and in addition the material has already in a known way been mixed with plasticizing oil, materials for rendering the treated material more adhesive, or with chemical regenerating mediums, and it is in a condition already mixed with the latter types of mediums that the material reaches the device of the invention.

The structure of the invention preferably includes a pair of discs as referred to above, these discs being provided, respectively, with circular rows of intermeshing teeth surrounded by the above-mentioned gap, and the outer regions of the gap where it is narrowest communicate with depressions in the form of radial or curved grooves formed in the work faces of the discs and situated in the region of the flat outer peripheral surfaces of these work faces which merge into the converging surfaces which define the gap between the discs, these flat surfaces which extend from the regions of the grooves being parallel to each other.

The invention is illustrated by way of example in the accompanying drawing which forms part of this application and in which:

FIG. 1 schematically illustrates an entire installation for continuously reclaiming the rubber scrap;

FIG. 2 is a fragmentary sectional view of the discs of the invention, the plane of the section of FIG. 2 including the common axis of the discs;

FIG. 3a shows the configuration of one of the discs at its working face;

FIG. 3b shows the configuration of the other of the discs at its working face;

FIG. 4a illustrates in a top plan view the configuration of one of the teeth of the discs of the invention;

FIG. 4b shows in a top plan view another possible configuration for the teeth of the discs of the invention; and FIG. 4c shows in a top plan view how a pair of differently constructed teeth cooperate with each other.

Referring now to FIG. 1, the rubber scrap which has been finely pulverized to the greatest possible extent and which has been sieved to a uniform grain size is in the form of old rubber which is sucked from the sieving or grading machine by way of a cyclone 1 which delivers the material to a known feeding device 2, the material being received in a suitable supply container of the feeding device 2. This device 2 preferably simultaneously separates, with a known structure, ferromagnetic particles from the rubber scrap. The device 2 uniformly feeds the finely pulverized rubber to a transporting screw 3. The transporting and mixing screw 3 communicates with and receives plasticizers and other regenerating mediums required for reclaiming purposes from a supply container 4 from which these additives are supplied to the screw 3 in a metered manner. The screw 3 mixes these additives with the pulverized rubber in a relatively coarse manner and delivers the thus mixed materials to a continuous mixer, such as the toothed-disc mill 5 where a final intimate mixing is provided. From the mill 5 the material, after being separated in a cyclone 6, reaches suitable containers 7, 7', 7'', in which the material is stored, and the containers can be arranged so as to form one continuous container in which the materials are stored for a given period of time. While being stored, the additives are free to act and swell the particles.

When, after a given period of storage, the material is in a condition suitable for further treatment, it is delivered either pneumatically or mechanically, preferably also through a cyclone, to the supply container 8 of the reclaiming device proper. A rotary screw 9 is situated in the lower region of the supply container 8, and the screw 9 is driven through a steplessly adjustable drive 10, the driven screw 9 feeding the material through the central inlet or feed opening 11 of one of the discs 12 of the invention. In the illustrated example this particular disc 12 is stationary while the other disc 13 is a rotary disc. The discs 12 and 13 are situated in a suitable housing 14 and the disc 13 is supported for rotary movement by any suitable bearings. It is operatively connected with a rotating means, including the pulleys shown at the right of the housing 14 in FIG. 1, so that in this way the disc 13 can be rotated with respect to the stationary disc 12, and these discs have a common axis which is coincident with the axis of rotation of the disc 13 as well as with the axis of rotation of the screw 9. The discs not only have a common axis, but in addition they have equal outer diameters and they are arranged as indicated diagrammatically in FIG. 1 within the housing 14.

As is apparent from FIG. 2, which shows the discs 12 and 13 in a transverse section at one side of their common axis, the discs 12 and 13 have directed toward and located adjacent each other working faces which define the annular gap 12'. This gap is defined by surfaces of the discs which converge toward each other in a direction toward the outer peripheries of the discs, so that the thickness of the gap 12 gradually diminishes toward the outer peripheries of the discs. At their outer peripheries the discs 12 and 13 are respectively provided at their working faces with flat annular surfaces 24 and 24' which are parallel to and closely adjacent to each other, these flat annular peripheral surfaces of the working faces surrounding the gap 12'. Inwardly of the gap 12' the discs are respectively provided with circular rows of teeth 22 and 22' which may have in cross section a trapezoidal configuration, as is apparent from FIGS. 2 and 4a. The teeth 22 and 22', because they are spaced from each other in circular rows, will provide a pulsating flow of the material centrifugally into the gap 12', and in order to enhance the centrifugal action the rotary disc 13 carries at its center, in alignment with the feed opening 11 of the stationary disc 12, a rotary impeller 25 which serves to centrifugally throw the material through the spaces between the intermeshing circular rows of teeth into the gap 12'. The working faces of the discs 12 and 13, at their portions which define the gap 12', are provided with raised and depressed portions, the depressed portions preferably taking the form of grooves 23 and 23' for the discs 12 and 13. These grooves, as is particularly apparent from FIGS. 3a and 3b, extend substantially radially in the illustrated examples and they are situated at the regions where the flat peripheral surfaces 24 and 24' of the working faces merge into the converging surfaces of the working faces which define the gap 12' between themselves.

In the illustrated example, the disc 12 which is formed with the central feed opening 11 is stationary, while the disc 13 is supported for rotary movement, as pointed out above. The treated material which passes through the gap 12' and then out through the extremely narrow space between the surfaces 24 and 24' falls into a receiving means formed by a collecting chamber 14 situated at the bottom of and communicating with the interior of the housing in which the discs 12 and 13 are situated. This receiving means 14 is formed with a suction inlet opening 15, and the interior of the chamber 14 communicates with a suction blower 16 so that operation of the latter serves to draw cool air into the collection chamber 14. Thus, the material which issues from the discs 12 and 13 of the invention is received in the receiving means 14 simultaneously with the introduction of cool air into the latter, and this material with the cool air is delivered by the blower 16 to a cyclone separator 17 from where the treated material, separated from the air, is delivered to a suitable wagon 18 or the like which serves to carry away the treated material.

In the event that the material which is treated is particularly sticky, an additional means 19 is provided for introducing a separating medium such as, for example, a metered amount of zinc stearate, or a similar separating medium which can be used for powdering or dusting the sticky particles.

It is also possible, as pointed out above, to provide the device with a means for introducing additional fluid, in the form of steam or air, and this latter fluid-introducing means can take the form of the hollow shaft 20 on which the rotary feed screw 9 is mounted, this hollow shaft 20 having its interior connected through a suitable connecting structure 20' with a source of steam or air which thus will flow through the hollow interior of the shaft 20 and through the feed opening 11 to be received through the latter with the material fed by the screw 9 and thus advance through the discs 12 and 13 of the invention in the manner described above.

In the event that additional fluid is desired, or if it is not convenient to apply fluid through a hollow shaft 20 and connection 20', it is possible to use a fluid-supply conduit means formed by one or more conduits 21 which extend through the housing for the discs 12 and 13 and through the stationary disc 12 directly into communication with the gap 12' defined between the discs 12 and 13, so that in this way the fluid, which can be steam or air, can be directly introduced into the annular gap 12'.

FIG. 2 shows, in cross section as pointed out above, the manner in which the discs 12 and 13 cooperate with each other, FIG. 2 illustrating the feed opening 11 formed centrally of the stationary disc 12 as well as the rotary impeller or distributing blade structure 25 which serves to centrifugally advance the material into the space between the discs 12 and 13. The manner in which the teeth 22 and 22' intermesh is particularly apparent from FIG. 2, and FIG. 2 in addition illustrates the depressions 23 and 23' and the parallel flat peripheral surfaces 24 and 24' of the working faces of the discs 12 and 13, respectively. Thus, the discs 12 and 13 at their working faces limit and define between themselves, by way of the raised and depressed portions of these working faces, the gap 12' which is of substantially wedge-shaped cross section and which tapers toward the outer periphery of the discs. Because of the centrifugal force with which the treated material is thrown into the space between the discs, outwardly beyond the rotary impeller 25, the treated material passes in a matter of seconds through the space between the discs to discharge therefrom and be collected in the receiving means 14 in the manner described above.

FIG. 3a shows how the series of teeth 22 are arranged in a row along a circle which surrounds the inlet opening 11 and which is surrounded by the gap 12'. The teeth 22 in the illustrated example are, in cross section, of a trapezoidal configuration. The depressions 23 are of course arranged outwardly beyond the teeth 22, and these depressions merge smoothly into the outer peripheral surface 24 which extends parallel to the corresponding surface 24' of the disc 13. The distributing impeller 25 is arranged centrally of the disc 13 and serves to uniformly distribute the material which is treated between both of the discs and in particular to the intermeshing rows of teeth 22 and 22'. It is to be noted in particular from FIG. 2 that when the discs 12 and 13 have the operative relationship with respect to each other which is shown in FIG. 2, the impeller 25 extends across the plane which is normal to the common axis and which extends between the surfaces 24 and 24', so that in this way the material which enters through the feed opening 11 is uniformly distributed by the impeller 25 between the rows of teeth 22 and 22' and between the pair of discs 12 and 13. While the depressions 23 and 23' are shown in the form of radial grooves, they can take the form of curved grooves or they can be inclined with respect to radial planes.

In connection with FIGS. 3a and 3b, it is to be noted that only two of the teeth 22 and 22' of each circular row are illustrated, although it is to be understood that each circular row includes more teeth which are suitably spaced from each other and which intermesh in the manner shown in FIG. 2 so as to produce the pulsating delivery of the material into the gap 12'.

The configuration of the teeth 22 and 22' is particularly apparent from FIG. 4a which shows one of the teeth 22 as it appears in a top plan view, and of course the teeth 22' are of the same construction. Thus, it is apparent that the teeth 22 and 22' are tapered from their relatively large base portions where they are joined integrally, for example, with the discs 12 and 13, and they have flat outer tips so that in this way the trapezoidal configuration of the cross section is achieved.

However, such a configuration is not at all essential, and FIG. 4b shows a tooth 26 which may be used instead of the tooth 22. In other words the teeth of the disc may take the form of the tooth 26 shown in FIG. 4b. This tooth has an elliptical base surface so that it has a substantially boat-shaped configuration, and this configuration may replace the trapezoidal form of the teeth 22 and 22'.

It may be found highly desirable to provide, in accordance with the particular requirements of the material which is treated, one of the discs with one type of tooth and the other of the discs with another type of tooth, so that, for example, the teeth 22 of trapezoidal cross section can be included in one of the discs and the teeth 26 of elliptical configuration can be arranged on the other of the discs, so that as the teeth of one disc slide past the teeth of the other discs, there will be defined between these teeth the wedge-shaped gap 27 indicated in FIG. 4c.

Of course, other types of disc constructions and other types of elevations and depressions in the working faces thereof can be provided, so long as they subject the particles to the stresses of the invention as described above.

In connection with the teeth of the discs, these teeth forming raised or elevated portions of the discs, it is to be noted that the teeth serve the purpose of uniformly distributing the material which is to be treated over the entire working faces of the discs in a pulsating manner. Thus, during rotation of the discs 13 with respect to the disc 12 the teeth 22' will alternately cover the gaps between the teeth 22 and uncover these gaps, so that in this way the pulsating delivery of the material to the gap 12' is achieved. At the teeth 22 and 22', moreover, or at the teeth 26 or the combination of teeth 22 and 26, the above-referred to friction, crushing and shearing forces will take place individually or in combination, whereas in the gap 12' in particular, the milling stresses or forces will be provided, especially at that location where the thickness of the gap is relatively large, and at the outer end or narrow end of the gap and between the surfaces 24 and 24' there will be primarily crushing forces acting on the material to be treated. The crushing and friction forces can, in particular, be intensified by way of the use of the elliptical teeth 26 or by using conical teeth which mesh with each other but which have an elliptical cross section. Thus, the circular rows of teeth one of which rotates with respect to the other provides between the teeth continuously changing wedge-shaped spaces in which the material is crushed in a pulsating manner, and, after passing through the narrowest portion of these wedge-shaped gaps between the teeth the material is again released. Inasmuch as the rubber particles, as a result of the fast rotation of one or both of the discs, is impelled by centrifugal force through the space between the discs, the through-put time required for treatment of the materials with the discs of the invention takes place in a matter of seconds. At least one of the discs is capable of being mechanically or hydraulically adjusted in an axial direction so as to be able to adjust the pressure which the discs apply to the material treated therebetween and so as to adapt the construction to the particular conditions which are encountered.

The means which communicates with the feed opening 11 to supply the material to the discs of the invention includes the steplessly adjustable drive for the worm screw 9, as referred to above, so that in this way a charging of the space between the discs which is as uniform as possible can be derived by way of suitable adjustment of the speed of rotation of the screw 9, and thus an absolutely uniform feeding of the material through the feed opening 11 into the gap 12' is achieved. The particular temperature and pressure of steam introduced by way of the hollow shaft 20 and/or by way of the conduits 21 will be determined by the properties of the material which is treated, this latter material taking the form of rubber, which may be natural or synthetic or which may be mixtures of natural and synthetic rubber. Thus, the steam which is introduced fulfills a two-fold purpose, on the one hand to produce a certain degree of plasticizing and on the other hand to wet or humidify the material.

The treated material which is derived from the structure of the invention is for the most part fully plasticized and is either fed directly, using the heat which is already contained in the material, to so-called strainers or refiners, or it is simply drawn off in the manner shown in FIG. 1 and described above so as to be received in suitable wagons 18. The inflow of cool air derived by the blower 16 and the inlet 15 washes the treated material issuing from the discs 12 and 13 into the receiving means 14, and it is the thus-washed particles which are separated from the air in the cyclone 17. The cooling of the individual particles which takes place by way of the air introduced through the inlet 15 is so intense that depending upon the degree to which the material is adhesive in its nature, it can be immediately stored. In the case where the material is adhesive to a relatively high degree, so that the material is fairly sticky, it is possible to introduce together with the cooling air zinc stearate or another suitable separating medium in an accurately metered manner, so that the sticky material can also be cooled and simultaneously dusted or powdered with a separating medium of the above type, thus preventing sticking together of the particles, and thus further treatment of the treated material in required, easily metered quantities can be carried out without difficulty.

Satisfactory reclaimed products have been achieved with methods of the invention, as well as with the apparatus of the invention, carried out according to the following examples, in which all parts are by weight:

Example 1

100 parts of scrap of protector rubber composed of a vulcanized rubber mixture were pulverized in the usual manner and brought to the highest possible degree of uniform fineness where the individual particles have a size ranging between approximately 0.4 and 0.6 mm. This pulverized material was then intimately mixed with 2–3 parts of a zinc salt of pentachlorothionic acid, 3–4 parts of a plasticizer (tributoxyethylphosphate) 3–4 parts of spruce or pine tar, and 20 parts of regenerating oil, and the resulting mixture was stored for a period of time which was long enough to permit the chemical reclaiming mediums to act to their full extent on the material. Then the material was, in the manner described above, subjected continuously to the mechanical treatment of the invention during which the circumferential speed of the disc 13 was maintained at 10–20 m./sec., the through-put of the material was at the rate of 100–150 kg./h., and the power consumption was approximately 20–25 kw.

Example 2

100 parts of protector scrap made of vulcanized natural rubber and Buna S (scrap in a ratio of 1:1) were, after pulverizing, intimately mixed with 2–3 parts of a zinc salt of pentachlorothionic acid, 5 parts of a plasticizer (methylester) sebacic acid, 5 parts of regenerat-oil, and 5 parts of pine tar, and after the end of the swelling action were subjected to the mechanical stresses of the invention as described above, and during this mechanical action the structure was operated in the manner described above in connection with Example 1, while steam at a temperature of 120–130° C. was blown in to the gap 12'.

Example 3

100 parts of protector scrap made of synthetic rubber was initially pulverized in a known manner and then intimately mixed with 3 parts of a zinc salt of pentachlorothionic acid, 5 parts of a plasticizer (butylester) sebacic acid, 10 parts of regenerating oil and 5 parts of pine tar, and then again subjected to the mechanical stresses of the invention in the manner described above in connection with Example 1.

All three of the above examples provided a reclaimed product which was fully homogeneous and which had a high quality of plasticity, as well as high quality mechanical properties and a very good capability of being further treated without difficulty.

Of course, it is necessary to carry out the method of the invention, as in the case of known methods, in accordance with the particular degree of plasticity which is desired, taking into consideration the initial mixture which constitutes the old rubber which is being reclaimed, so that in this way proper regenerating mediums can be added in the right amounts and also of the right types. As a further variation it is possible to provide mechanical working and additional use of steam so as to influence the working temperatures and dampness or moisture content of the treated material.

What is claimed is:

1. In a method for continuously reclaiming vulcanized, pre-pulverized rubber scrap which is subjected to the influence of heat as well as to the influence of predetermined additives with which the pulverized scrap is intimately mixed, the step of subjecting the pulverized, additive-bearing scrap to centrifugal forces while simultaneously exposing the scrap in a pulsating manner and in a matter of seconds to friction, milling, shearing, and crushing forces.

2. In a method as set forth in claim 1, the step of exposing the rubber scrap to steam for heating and moistening the scrap.

3. In a method as set forth in claim 1, the step of washing the reclaimed product with an air stream which simultaneously cools the reclaimed product.

4. In a method as set forth in claim 3, the step of adding to the air stream a separating medium, such as zinc stearate or the like.

5. In a method as set forth in claim 1, the step of feeding the reclaimed product, while using the heat contained therein, directly to a machine for further treatment of the reclaimed product.

6. In a method as set forth in claim 1, said scrap being exposed to said forces for a period not substantially exceeding five seconds.

7. In a method as set forth in claim 1, said scrap being exposed to said forces until plasticized.

8. In a method as set forth in claim 7, said additives including a placsticizer for said scrap.

References Cited

UNITED STATES PATENTS

| | | | |
|---|---|---|---|
| 1,133,952 | 3/1915 | Gare | 83—94 |
| 1,626,466 | 4/1927 | Hoover et al. | 241—15 |
| 1,653,472 | 12/1927 | Scherbaum | 241—261 |
| 1,661,721 | 3/1928 | Gardner | 241—93 |
| 1,708,123 | 4/1929 | Day | 241—18 |
| 2,126,672 | 8/1938 | Smith et al. | 241—19 |
| 2,318,693 | 5/1943 | Joyce et al. | 241—15 |
| 2,412,586 | 12/1946 | Knowland | 241—15 |

GERALD A. HOST, Primary Examiner

U.S. Cl. X.R.

241—23, 65, 261